US010093541B2

(12) United States Patent
Aasberg-Petersen et al.

(10) Patent No.: US 10,093,541 B2
(45) Date of Patent: Oct. 9, 2018

(54) PROCESS FOR PRODUCING SYNTHESIS GAS

(71) Applicant: Haldor Topsøe A/S, Kgs. Lyngby (DK)

(72) Inventors: Kim Aasberg-Petersen, Allerød (DK); Ib Dybkjær, Copenhagen Ø (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/120,317

(22) PCT Filed: Feb. 27, 2015

(86) PCT No.: PCT/EP2015/054120
§ 371 (c)(1),
(2) Date: Aug. 19, 2016

(87) PCT Pub. No.: WO2015/128456
PCT Pub. Date: Sep. 3, 2015

(65) Prior Publication Data
US 2017/0066651 A1    Mar. 9, 2017

(30) Foreign Application Priority Data

Feb. 28, 2014 (DK) ................................ 2014 70094
May 14, 2014 (DK) ................................ 2014 00263

(51) Int. Cl.
*C01B 3/38* (2006.01)

(52) U.S. Cl.
CPC .............. *C01B 3/382* (2013.01); *C01B 3/384* (2013.01); *C01B 3/386* (2013.01); *C01B 2203/0233* (2013.01); *C01B 2203/0244* (2013.01); *C01B 2203/0261* (2013.01); *C01B 2203/04* (2013.01); *C01B 2203/0475* (2013.01); *C01B 2203/062* (2013.01); *C01B 2203/0844* (2013.01); *C01B 2203/0883* (2013.01); *C01B 2203/1235* (2013.01); *C01B 2203/141* (2013.01); *C01B 2203/142* (2013.01); *C01B 2203/148* (2013.01); *C01B 2203/82* (2013.01)

(58) Field of Classification Search
CPC ...................................................... C01B 3/382
See application file for complete search history.

(56) References Cited

U.S. PATENT DOCUMENTS

2004/0063798 A1\* 4/2004 Erikstrup ................ C01B 3/382
518/704
2004/0182002 A1    9/2004 Malhotra et al.
2008/0275143 A1   11/2008 Malhotra et al.
(Continued)

FOREIGN PATENT DOCUMENTS

EP    1 016 643 A1    7/2000
EP    1 400 489 A1    3/2004
(Continued)

*Primary Examiner* — Douglas B Call
(74) *Attorney, Agent, or Firm* — Blank Rome LLP

(57) ABSTRACT

Process for the production of synthesis gas by catalytic steam reforming of a hydrocarbon containing feedstock in parallel in an autothermal steam reformer and heat exchange reformer, the heat for the steam reforming reactions in the heat exchange reformer being provided by indirect heat exchange with the combined effluent of the heat exchange reformer and a portion of the autothermal steam reformer.

11 Claims, 1 Drawing Sheet

(56) References Cited

U.S. PATENT DOCUMENTS

2013/0345324 A1* 12/2013 Knudsen ................ C01B 3/382
                                                                518/702
2015/0129806 A1*  5/2015 Filippi ..................... C01B 3/26
                                                                252/374
2015/0284248 A1* 10/2015 Farnell .................... C01B 3/382
                                                                252/373

FOREIGN PATENT DOCUMENTS

| EP | 1 403 216 A1 | 3/2004 |
| EP | 2 676 924 A1 | 12/2013 |
| GB | 2 407 819 | 5/2005 |
| WO | WO 2013/189791 A1 | 12/2013 |
| WO | WO2014/072679 * | 5/2014 |

* cited by examiner

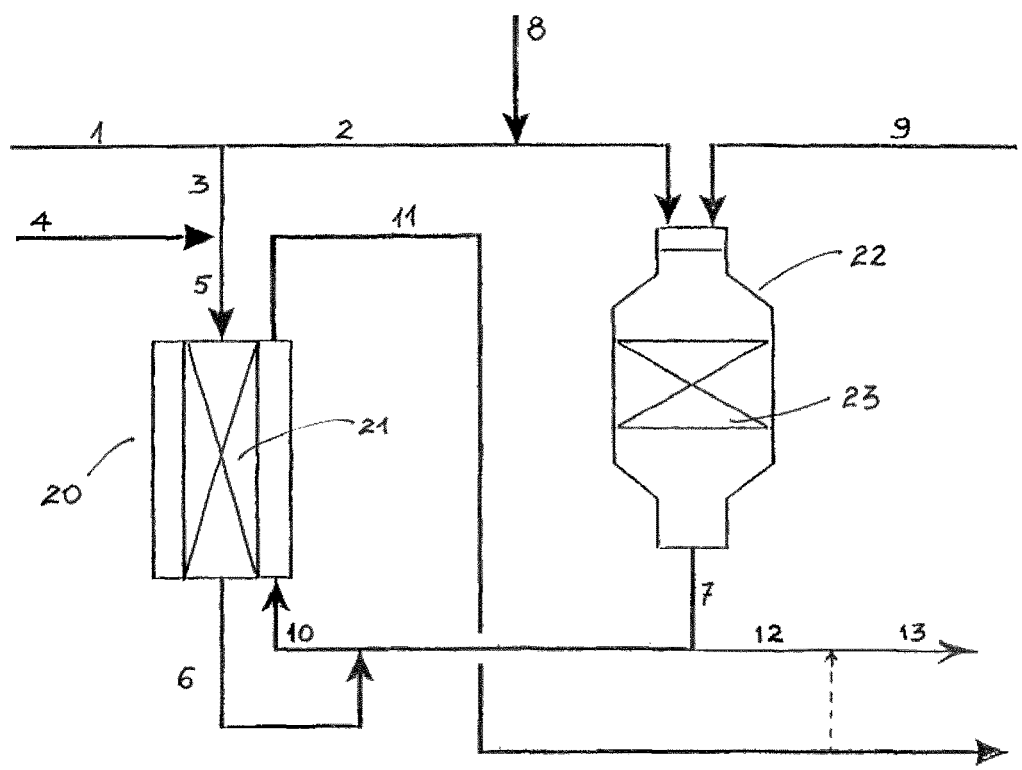

PROCESS FOR PRODUCING SYNTHESIS GAS

FIELD OF THE INVENTION

The present invention relates to a process for production of synthesis gas used especially for the production of liquid hydrocarbons such as diesel by Fischer-Tropsch synthesis, methanol, or gasoline. The invention relates in particular to a process for the production of synthesis gas in which part of the hydrocarbon feed is passed through a first reforming process line comprising autothermal reforming (ATR) while the remaining minor portion of the hydrocarbon feed is passed through a second reforming process line comprising heat exchange reforming and in which a portion of the effluent gas from the autothermal reformer is used to provide heat for the steam reforming in the heat exchange reformer by indirect heat exchange.

BACKGROUND OF THE INVENTION

A typical plant for production of gasoline, liquid hydrocarbons such as diesel, or methanol from for example natural gas typically comprises of the following main process units: (a) air separation, (b) synthesis gas preparation via ATR, (c) the actual synthesis of e.g. diesel, (d) upgrading and/or separation. In the synthesis gas preparation section, hydrocarbon feedstock, normally natural gas is normally pre-reformed, and then passed through an autothermal reformer (ATR) to produce a synthesis gas. An oxygen containing stream is also added to the ATR. This synthesis gas is cooled, water is removed and the thus dehydrated synthesis gas is converted to a raw product. The raw product is then upgraded and/or separated from undesired by-products to provide the desired end product, such as diesel or gasoline.

As an example, in a plant for production of diesel, Fischer-Tropsch (FT) synthesis is carried out for producing a mixture of hydrocarbons comprising for example wax and liquids as well as a range of lighter and gaseous hydrocarbons with hydrogen and carbon monoxide as reactants. In this case the upgrading section would normally comprise hydrocracking for production of the final product which is mainly diesel.

The FT synthesis often also produces an off-gas in the form of so-called tail gas comprising unreacted hydrogen and carbon monoxide and light hydrocarbons (typically with 5 or less carbon atoms) including olefins. The tail gas often also comprises carbon dioxide and other typically inert compounds such as nitrogen and argon. Part of the tail gas may be recycled to the ATR section to adjust the $H_2/CO$-molar ratio in the synthesis gas to the desired value for FT synthesis which typically is around 2.

In some FT-synthesis, in particular so-called Low Temperature FT-synthesis utilising catalysts comprising cobalt, carbon dioxide is inert in the synthesis, and it may be advantageous to remove carbon dioxide partly or completely from the synthesis gas used in the FT-process. Another example is a plant for production of methanol. In this case the actual synthesis is production of methanol from the synthesis gas. The upgrading and purification is in often one or a number of distillation columns to produce the methanol in the required purity depending upon the final application.

Typically large scale plants are based on ATR as described above for the production of synthesis gas. A low steam-to-carbon molar ratio is preferred to obtain the highest plant efficiency (energy efficiency) and the lowest overall capital cost.

An alternative to ATR is to use a synthesis gas unit based on steam reforming (SMR). However, for large scale plants, synthesis gas units based on SMR are known to be less efficient than ATR and also more capital intensive.

Large scale plants are expensive and there is therefore a huge incentive to improving the plant efficiency. One well known method of improving the plant efficiency is to combine ATR with heat exchange reforming (HER). An HER reactor may be installed upstream and in series with the ATR, or in parallel to the ATR. In both cases the effluent from the ATR is used as source for the heat needed for the endothermic steam reforming reaction taking place in the HER. However, the effluent leaving the ATR is rich in carbon monoxide due to the desired operation at low steam-to-carbon molar ratio in the ATR, which is normally below 1.2, e.g. below 1.0 or below 0.8. Such gases may—when they are contacted with metal surfaces in a certain temperature window—lead to so-called metal dusting corrosion of such surfaces of, in this case, the heat exchange reformer.

Metal dusting shall not be confused with carbon deposition. The latter is a phenomenon in which carbon deposits in catalysts and cause their deactivation and/or a rapid increase of the pressure drop to high levels. Known measures to mitigate this problem have been saturating hydrocarbons in the gas fed to the reformer, as well as using noble catalysts as reforming catalysts.

Unsaturated hydrocarbons are easy to crack and therefore end as carbon deposits in catalysts. In contrast, metal dusting is a completely different phenomenon which involves metal disintegrating to dust. It has to be understood also that carbon deposition on catalysts or on metal surfaces does not necessarily lead to metal dusting. Metal dusting is a deteriorating attack of the carbon monoxide rich gas on alloys based on iron and/or nickel and conventional ways of protecting against metal dusting have been the use of expensive high alloy steels.

The operation of autothermal reforming and heat exchange reforming in parallel or series is well known in the art. For instance, WO 2012/084135 (FIG. 4 herein) shows a series arrangement in which an ATR effluent which together with steam enters the non-catalytic side (shell side) of a heat exchange reformer. Metal dusting in the heat exchange reformer is thus mitigated by adding steam to the ATR effluent gas. Being a series arrangement, such ATR effluent gas is not combined with primary reformed gas from the heat exchange reformer before delivering heat to the reforming reactions in the heat exchange reformer. Instead the gas leaving the catalyst side of the heat exchange reformer is directed to the autothermal reformer.

WO-A-2013/189791 shows also a series arrangement in which a portion of the ATR effluent gas is used to deliver heat in the heat exchange reformer while another portion is by-passed and passed through a waste heat boiler. This in order to solve the problem of temperature control in the heat exchange reformer, for example when fouling occurs. Metal dusting issues are not addressed.

EP-A-1403216 (FIG. 2) and EP-A-1106570 show parallel arrangements of heat exchange reforming and autothermal reforming in which all ATR effluent gas is combined with reformed gas from the heat exchange reformer and then used to deliver heat to the reforming reactions in the heat exchange reformer.

As mentioned above, it is an advantage in plant design to reduce the steam-to-carbon molar ratio to optimise plant economics, as i.a. less water is carried in the process. However, when the steam-to-carbon molar ratio in the ATR is reduced, particularly to values below 1.0, the "agressivity" of the ATR effluent gas increases, meaning that its metal dusting potential increases. Therefore the combination of ATR operating at a low steam-to-carbon molar ratio and heat exchange reforming is very challenging.

Metal dusting is a complex process involving many steps. The potential of a gas to cause metal dusting if often evaluated considering one or both of the following reactions:

$$CO + H_2 \leftrightarrow C + H_2O \quad (a)$$

$$2CO \leftrightarrow C + CO_2 \quad (b)$$

The reaction quotient Q can for the two reaction be expressed as:

$$Q_a = P_{H2O}/(P_{CO} \times P_{H2}) \quad \text{Reaction } (a)$$

$$Q_b = P_{CO2}/(P_{CO} \times P_{CO}) \quad \text{Reaction } (b)$$

The thermodynamic potential for metal dusting increases as the value of Q decreases at a given temperature of the metallic surface. In the above formulas $P_x$ denotes the partial pressure of component X.

It is therefore an object of the present invention to provide a process combining ATR and HER in parallel for production of synthesis gas leading to an overall higher efficiency of plants for production of products such as methanol, gasoline and diesel from natural gas.

This and other objects are solved by the present invention.

SUMMARY OF THE INVENTION

The invention is a process for the production of synthesis gas by catalytic steam reforming of hydrocarbon feedstock by parallel arrangement of heat exchange reforming (HER) and autothermal reforming (ATR) comprising: passing a first hydrocarbon feedstock through an autothermal reforming stage and withdrawing an effluent gas of raw synthesis gas; dividing this raw synthesis gas into at least a first and second portion of raw synthesis gas; passing a second hydrocarbon feedstock through the catalyst side of a heat exchange reforming stage and withdrawing a primary reformed synthesis gas; combining a portion or all of the primary reformed gas with the first portion of raw synthesis gas to form a synthesis gas, and passing the synthesis gas through the non-catalyst side of the heat exchange reforming stage to provide heat for the steam reforming reactions in said catalyst side by indirect heat exchange with said synthesis gas; withdrawing from the heat exchange reforming stage a cooled synthesis gas.

Hence, the present invention enables in an elegant and simple way to solve the problem of reducing or mitigating or eliminating metal dusting in the heat exchange reformer while at the same time maintaining a high efficiency (or low capital cost) by keeping a low S/C-ratio in the ATR.

The concept of combining the effluent from an ATR with the reformed gas from the catalytic side of the HER is known. It is however counterintuitive to combine only part of the effluent from the ATR with the effluent from the HER. The effluent from the ATR has a higher temperature than the effluent from the catalyst side of the HER. This means that the temperature of the synthesis gas (mixture of the HER effluent and the first portion of the raw synthesis gas from the ATR) is between the temperature of the ATR effluent and the temperature of the effluent of the catalyst side of the HER. As the fraction of the effluent gas from the ATR that bypasses the HER (second portion of raw synthesis gas) is increased the temperature of the synthesis gas entering the HER will decrease. As the synthesis gas temperature decreases so does the driving force for heat transfer in the HER (for the same inlet and outlet temperatures and flows on the catalyst side of the HER). This leads to an increase in the required heat transfer area of the heat exchange reformer and consequently increased cost of the apparatus.

Preferably, the second portion of raw synthesis gas is not used for providing heat for steam reforming in the non-catalyst side of a heat exchange reforming stage.

Autothermal reforming (ATR) is described widely in the art and open literature. Typically, the autothermal reformer comprises a burner, a combustion chamber, and catalyst arranged in a fixed bed all of which are contained in a refractory lined pressure shell. Autothermal reforming is for example described in Chapter 4 in "Studies in Surface Science and Catalysis", Vol. 152 (2004) edited by Andre Steynberg and Mark Dry.

In the ATR, oxidant gas, and in some cases steam is added. Synthesis gas ("syngas"), herein referred as "raw synthesis gas" is formed by a combination of partial oxidation and steam reforming in the autothermal reformer.

By the term "oxidant gas" is meant a stream comprising oxygen, preferably more than 75 vol %, more preferably more than 85 vol % oxygen, and most preferably more than 95% oxygen. Examples of oxidant gas are oxygen, mixture of oxygen and steam, mixtures of oxygen, steam, and argon, and oxygen enriched air.

The temperature of the synthesis gas leaving the ATR (raw synthesis gas) is between 900 and 1100° C., or 950 and 1100° C., typically between 1000 and 1075° C. This hot effluent synthesis gas leaving the autothermal reformer (raw synthesis gas) comprises carbon monoxide, hydrogen, carbon dioxide, steam, residual methane, and various other components including nitrogen and argon.

So far solutions proposed to the catastrophic corrosion problem of metal dusting have involved the use of highly resistant alloys, yet at a high capital cost, or operation of the ATR at high steam-to-carbon molar ratios, also with the penalty of higher capital costs and/or reduction of plant efficiency due to the need of carrying larger amounts of water (steam) in the process.

By the term "hydrocarbon feedstock" is meant a stream used in the process which comprises hydrocarbons. In the broadest sense, hydrocarbons are organic compounds comprising hydrogen and carbon. The hydrocarbons may be as simple as e.g. methane $CH_4$, and may comprise more complex molecules. Natural gas is a conventional feed having methane as its major constituent. Natural gas and desulfurized natural gas are examples of hydrocarbon feedstocks. Another example is a mixture of natural gas and LPG.

By the term "indirect heat exchange" is meant that there is no direct contact between the catalyst and the heating medium, here the synthesis gas resulting from mixing the first portion of raw synthesis gas and the primary reformed gas, and thereby no direct contact with the second hydrocarbon feedstock optionally mixed with steam, passing through the catalyst, as these are separated by a metal wall.

In a particular embodiment in connection with the above or below embodiments, the process further comprises combining a second portion of the raw synthesis gas with all or a portion of said cooled synthesis gas. The resulting synthesis gas may then be used for downstream synthesis, such as for production of methanol, diesel and gasoline.

In a particular embodiment in connection with one of the above or below embodiments, said first hydrocarbon feedstock and said second hydrocarbon feedstock are split from a single hydrocarbon feedstock and prior to split the single hydrocarbon feedstock is subjected to pre-reforming.

In this embodiment the single hydrocarbon feedstock is split either before or after steam addition, preferably after steam addition. Additional steam may be added to the second hydrocarbon feedstock, which is subjected to heat exchange reforming after the split.

In another embodiment in connection with one of the above or below embodiments, each individual stream in the form of first hydrocarbon feedstock, or second hydrocarbon feedstock, or both, are subjected to pre-reforming prior to passing through the autothermal reforming or heat exchange reforming.

During pre-reforming, preferably in an adiabatic pre-reformer most or all of the higher hydrocarbons (hydrocarbon compounds with 2 or more carbon atoms) are converted according to the following reactions:

$$C_nH_m + nH_2O \rightarrow (\tfrac{1}{2}m+n)H_2 + nCO \quad (1)$$

$$3H_2 + CO \leftrightarrow CH_4 + H_2O \quad (2)$$

$$CO + H_2O \leftrightarrow H_2 + CO_2 \quad (3)$$

Reactions (2) and (3) are normally close to equilibrium at the outlet of the pre-reformer.

Preferably, the pre-reforming stage is conducted adiabatically in a fixed bed of nickel catalyst. Thus, the adiabatic pre-reformer contains preferably a fixed bed of catalyst having nickel as the active constituent on a suitable carrier, such as MgO/Al2O3 or Mg—Al spinel.

In another embodiment in connection with one of the above or below embodiments, tail gas from downstream synthesis of diesel, methanol or gasoline, is combined with the first or second hydrocarbon feedstock. For plants for production of synthetic hydrocarbons such as diesel involving a Fischer-Tropsch synthesis step, the tail gas is preferably added only to the first hydrocarbon feedstock.

Preferably, tail gas as used herein means an off-gas from a Fischer-Tropsch synthesis unit comprising:
5-35 vol. % carbon monoxide (CO)
5-35 vol. % hydrogen ($H_2$)
5-35 vol. % carbon dioxide ($CO_2$)
more than 2 vol. % methane ($CH_4$)

Such tail gas in many cases also comprises higher hydrocarbons including olefins, as well as argon and nitrogen.

In another embodiment in connection with one of the above or below embodiments, the steam-to-carbon molar ratio of the first hydrocarbon feedstock (i.e. for ATR operation) is lower than the steam-to-carbon molar ratio of the second hydrocarbon feedstock (i.e. for heat exchange reformer operation). In particular, the steam-to-carbon molar ratio of the first hydrocarbon feedstock is less than 1.20, preferably below 1.0, more preferably below 0.9. For instance the steam-to-carbon molar ratio of this first hydrocarbon feedstock is 0.4-1.2, or 0.4-1.0, or 0.4-0.9, while the steam-to-carbon molar ratio of the second hydrocarbon feedstock is for instance 1.5-4.0.

The steam-to-carbon molar ratio, S/C, means here the number of moles of steam divided by the number of moles of hydrocarbon carbon. The number of moles of steam includes all the steam added to the hydrocarbon feedstock immediately upstream the ATR or HER as the case may be. The hydrocarbon carbon means the hydrocarbons present in the feedstock and includes the hydrocarbon carbon from the recycled tail gas.

In another embodiment in connection with one of the above or below embodiments, the volumetric flow rate of the second hydrocarbon feedstock is 1-30%, preferably 5-25%, most preferably 5-20% or 5-15%, of the volumetric flow rate of the first and second hydrocarbon feedstock combined.

In another embodiment in connection with one of the above or below embodiments, the ratio between the volumetric flow rate of the second portion of the raw synthesis gas stream to the volumetric flow rate of the effluent gas of raw synthesis gas is 50-95%, preferably 60-90%, most preferably 65-85%. As the ratios (denoted herein also as bypass ratios) above increase, the propensity for metal dusting is reduced, thus enabling also use of more inexpensive materials in the heat exchange reformer.

In another embodiment in connection with one of the above or below embodiments, the ratio between the volumetric flow rate of the second portion of the raw synthesis gas stream to the volumetric flow rate of the effluent gas of raw synthesis gas is from 15% to just below 50%, preferably 20-49%, more preferably 20-45%, most preferably 20-40%, for instance 20%, 30% or 35%. At these ranges of the bypass ratios metal dusting is also reduced in the heat exchange reformer while still being able to operate the ATR at S/C-ratios significantly below 1, for instance 0.6 or 0.4.

The inclusion of the heat exchange reformer in parallel with the ATR according to the present invention results in a higher plant efficiency compared to a situation where only an ATR is used. This means i.a. that other sections of the plant may be reduced in size and still result in the same specific production, for instance when measured as the moles of produced synthesis gas ($CO+H_2$) per unit mol natural gas feed. Hence lower capital costs are required. In addition, there is less expenses related to the feed and less carbon dioxide emission per produced unit of syngas. Moreover, efficiency in terms of energy consumption, for instance in terms of use of oxygen in the ATR is also significantly improved. The invention enables therefore also the provision of a heat exchange reformer with all its concomitant advantages without incurring the high penalty of increasing the risk of metal dusting in such a reformer. Having a high risk of metal dusting in the heat exchange reformer will simply impair its use: it will require the use of highly expensive metal alloys in the heat exchange reformer, or using a high S/C-ratio, such as 1 or higher, in the ATR.

In another embodiment in connection with one of the above or below embodiments, carbon dioxide is removed completely or partly from the second portion of raw synthesis gas, the cooled synthesis gas, or from the synthesis gas resulting from combining said second portion of raw synthesis gas and said cooled synthesis gas. The carbon dioxide is preferably removed by absorption in a suitable solvent, in a membrane unit or by other means. This enables a more efficient FT-synthesis particularly where the catalyst is cobalt based, as $CO_2$ is an inert in the process.

In another particular embodiment in connection with one or more of the above embodiments, catalytic partial oxidation (CPO) is used instead of autothermal reforming (ATR).

BRIEF DESCRIPTION OF THE DRAWING

The accompanying FIGURE shows a specific embodiment of the invention comprising the parallel arrangement of autothermal reforming and heat exchange reforming with tail gas addition to the autothermal reforming stage.

DETAILED DESCRIPTION

In the accompanying FIGURE single hydrocarbon feedstock 1, such as natural gas, which may be pre-reformed, is split into a first hydrocarbon feedstock 2 and second hydrocarbon feedstock 3. The latter is combined with steam 4 to form gas stream 5 which is then passed through heat exchange reformer 20 having one or more catalyst tubes or regions containing catalyst 21 (catalyst side). The gas stream 5 is reformed under contact with catalyst 21 to form primary reformed synthesis gas 6. The first hydrocarbon feedstock 2, optionally mixed with steam, is mixed with recycled tail gas 8 from downstream synthesis such as Fischer-Tropsch synthesis and is then subjected to autothermal reforming in ATR unit 22 containing reforming catalyst bed 23 under the addition of oxygen 9. An effluent gas of raw synthesis gas 7 is withdrawn from the ATR, a first portion of which is combined with the primary reformed gas 6 to form synthesis gas 10. This synthesis gas 10 is used to deliver heat to the reforming reactions in catalytic side 21 by indirect heat exchange. Hence the synthesis gas 10 passes through the non-catalytic side (e.g. shell side) of the heat exchange reformer 20 resulting in cooled synthesis gas 11. This cooled synthesis gas 11 may be combined with a second portion 12 of the raw synthesis gas 7 to produce synthesis gas 13 for downstream processes.

EXAMPLE 1

Calculations have been made to simulate the synthesis gas section of a Gas-to-Liquids facility according to the invention as described herein and with reference to the accompanying FIGURE. Natural gas (NG) mixed with steam is used as feed (stream 1). 10% of the feed is sent to the heat exchange reformer (line 3). Additional steam is added to give a steam-to-carbon ratio of the heat exchange reformer feed of 3.5. The remaining part of the feed is mixed with tail gas (line 8) from a Fischer-Tropsch synthesis section for production of liquid hydrocarbons and passed to the ATR. The amount of steam in the feed (line 1) is adjusted such that the S/C-ratio in the feed to the ATR is 0.6. The amount of tail gas added in line 8 is adjusted to provide an $H_2$/CO-ratio downstream the ATR (line 7) of 2.00. Oxygen is also added to the ATR through line 9. The process conditions are designed to provide an exit temperature of 1025° C. from the ATR.

Part of the exit stream (line 7), i.e. raw synthesis gas from the ATR bypasses the heat exchange reformer through line 12 as the second portion of the raw synthesis gas. The remaining part is mixed with the effluent from the catalyst side of the heat exchange reformer (line 6) in the form of a primary reformed gas to give synthesis gas stream 10. Stream 10 provides by indirect heat exchange the heat to carry out the endothermic steam reforming reaction in the heat exchange reactor. The total production of $H_2$+CO in the synthesis gas unit is the sum of the $H_2$+CO in cooled synthesis gas stream 11 and the second portion of raw synthesis gas 12.

The table below shows the results of calculations for various values of the bypass ratio, i.e. volumetric flow of the second portion of the raw synthesis gas (stream 12) to the volumetric flow rate (kmol/hr) of the effluent gas of raw synthesis gas (stream 7).

Qa is the reaction quotient calculated from reaction (a) in the present specification. The thermodynamic potential for metal dusting increases with decreasing values of Qa.

| Bypass ratio[1] % | CO reduction, $Q_a$[2] bar | Specific prod. (CO + $H_2$)/NG mol/mol |
| --- | --- | --- |
| 0 | 0.0627 | 3.1777 |
| 20 | 0.0659 | 3.1777 |
| 60 | 0.0810 | 3.1777 |
| 70 | 0.0903 | 3.1777 |

[1]% of ATR effluent gas bypassing heat exchange reactor: stream 12/stream 7
[2]$Q_a = P_{H_2O}/(PCO * P_{H_2})$ for the CO reduction CO + $H_2$ = C + $H_2O$, reaction (a), on the shell side of the heat exchange reformer.

It is seen from the table that the thermodynamic potential for metal dusting decreases when the bypass ratio is increased and the same time it is possible to operate at low S/C-ratio in the ATR, here S/C=0.6. The production of synthesis gas per unit of natural gas feed is unaffected. For comparison the production has also been calculated for a scheme with only ATR (i.e. stand-alone ATR; with pre-reformer but without the use of a heat exchange reformer). A stand-alone ATR at same conditions results in lower specific prod: 2.9948 mol CO+$H_2$ pr mol NG and higher specific oxygen consumption: 0.1952 mol $O_2$ per mol CO+$H_2$, compared to 0.1769 mol $O_2$ per mol CO+$H_2$, which is the same for all bypass ratios in the table. This also shows that the efficiency, in terms of energy consumption, is higher when a heat exchange reformer is included.

EXAMPLE 2

Calculations have been made to simulate the synthesis gas section of a methanol plant according to the invention as described herein and with reference to the accompanying FIGURE. The parameters have been set to the same values as in Example 1 with the exception that the S/C-ratio in the feed to the ATR is 0.4. The only other difference from the parameters given in Example 1 is that no tail gas is added, i.e. volumetric flow in stream 8 is zero.

In methanol it is desired to have a so-called module of ca. 2. The module is defined as:

($FH_2$−$FCO_2$)/($FCO$+$FCO_2$), where FX is the flow of component X.

The results of the calculations are shown in the table below. It is seen that the thermodynamic potential of metal dusting decreases when the bypass ratio is increased.

| Bypass ratio[1] % | CO reduction $Q_a$[2] bar |
| --- | --- |
| 0 | 0.0444 |
| 20 | 0.0485 |
| 60 | 0.0674 |
| 70 | 0.0790 |

[1]% of ATR effluent gas bypassing heat exchange reactor: stream 12/stream 7
[2]$Q_a = P_{H_2O}/(PCO * P_{H_2})$ for the CO reduction CO + $H_2$ = C + $H_2O$, reaction (a), on the shell side of the heat exchange reformer The methanol module for all of the cases is the same, namely 1.9514. In comparison the methanol module for a concept based only on ATR (with pre-reformer but without the heat exchange reformer) is significantly lower, namely 1.8582. This indicates that the produced synthesis gas from the scheme including a heat exchange reformer has a better stoichiometry for downstream methanol synthesis and is thereby more efficient than a synthesis gas produced without the heat exchange reformer. In addition, a stand-alone ATR at same conditions results in a higher specific oxygen consumption: 0.1802 mol $O_2$ per mol $H_2$+CO compared to 0.1687 mol $O_2$ per mol CO+$H_2$, which is the same for all bypass ratios in the table.

The invention claimed is:

1. Process for the production of synthesis gas by catalytic steam reforming of hydrocarbon feedstock by parallel arrangement of heat exchange reforming (HER) and autothermal reforming (ATR) comprising:
    passing a first hydrocarbon feedstock through an autothermal reforming stage and withdrawing an effluent gas of raw synthesis gas;
    dividing the raw synthesis gas into at least a first and second portion of raw synthesis gas, wherein the ratio of the volumetric flow rate of the second portion of the raw synthesis gas to the volumetric flow rate of the effluent gas of raw synthesis gas is 50-95%;
    passing a second hydrocarbon feedstock through the catalyst side of a heat exchange reforming stage and withdrawing a primary reformed synthesis gas;
    combining a portion or all of the primary reformed gas with the first portion of raw synthesis gas to form a synthesis gas,
    passing the synthesis gas through the non-catalyst side of the heat exchange reforming stage to provide heat for the steam reforming reactions in said catalyst side by indirect heat exchange with said synthesis gas; and
    withdrawing, from the heat exchange reforming stage, a cooled synthesis gas.

2. Process according to claim 1 further comprising combining all or a portion of said cooled synthesis gas with the second portion of the raw synthesis gas.

3. Process according to claim 1, wherein said first hydrocarbon feedstock and said second hydrocarbon feedstock are split from a single hydrocarbon feedstock and, prior to split, the single hydrocarbon feedstock is subjected to pre-reforming.

4. Process according to claim 1, wherein each individual stream in the form of first hydrocarbon feedstock, or second hydrocarbon feedstock, or both, are subjected to pre-reforming prior to passing through the autothermal reforming or heat exchange reforming.

5. Process according to claim 1, in which tail gas from downstream synthesis of diesel, methanol or gasoline, is combined with the first or second hydrocarbon feedstock.

6. Process according to claim 1, in which the steam-to-carbon molar ratio of the first hydrocarbon feedstock is lower than the steam-to-carbon molar ratio of the second hydrocarbon feedstock.

7. Process according to claim 6 in which the steam-to-carbon molar ratio of the first hydrocarbon feedstock is less than 1.20.

8. Process according to claim 1, in which the volumetric flow rate of the second hydrocarbon feedstock is 1-30% of the volumetric flow rate of the first and second hydrocarbon feedstock combined.

9. Process according to claim 1, in which carbon dioxide is removed completely or partly from the second portion of raw synthesis gas, the cooled synthesis gas, or from the synthesis gas resulting from combining said second portion of raw synthesis gas and said cooled synthesis gas.

10. Process according to claim 1, in which catalytic partial oxidation (CPO) is used instead of autothermal reforming (ATR).

11. Process according to claim 1, in which the ratio between the volumetric flow rate of the second portion of the raw synthesis gas stream to the volumetric flow rate of the effluent gas of raw synthesis gas is 20-49%.

* * * * *